(12) United States Patent
Urban et al.

(10) Patent No.: US 8,484,944 B2
(45) Date of Patent: Jul. 16, 2013

(54) AERODYNAMIC DEVICE FOR THRUST REVERSER CASCADES

(75) Inventors: Michael Urban, Wichita, KS (US); Henry A. Schaefer, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 454 days.

(21) Appl. No.: 12/856,084

(22) Filed: Aug. 13, 2010

(65) Prior Publication Data

US 2012/0036716 A1 Feb. 16, 2012

(51) Int. Cl.
*F02K 3/02* (2006.01)
*F02K 1/54* (2006.01)
*B05B 12/00* (2006.01)

(52) U.S. Cl.
USPC ............... 60/226.2; 244/110 B; 239/265.25

(58) Field of Classification Search
USPC ......... 60/226.2, 230; 244/110 B; 239/265.25, 239/265.29, 265.37
See application file for complete search history.

(56) References Cited

U.S. PATENT DOCUMENTS

| 2,644,296 | A | * | 7/1953 | Sanz et al. | 60/230 |
| 3,081,597 | A | * | 3/1963 | Kosin et al. | 239/265.25 |
| 4,067,094 | A | * | 1/1978 | Ittner | 29/889.22 |
| 5,987,880 | A | * | 11/1999 | Culbertson | 60/204 |

* cited by examiner

*Primary Examiner* — Gerald L Sung
*Assistant Examiner* — Jacob Cigna
(74) *Attorney, Agent, or Firm* — Hovey Williams LLP

(57) ABSTRACT

A method and aerodynamic device for modifying at least one vane of a cascade thrust reverser. One or more of the aerodynamic devices may be formed and attached to forward-facing surfaces of vanes of the thrust reverser. The aerodynamic device may include a first side shaped to rest flush against at least a portion of the forward-facing surface of the vane, a second side opposite of the first side, a ledge portion protruding from the first side and configured to rest flush against a blunt leading edge of the vane, a rounded first end portion extending from the ledge portion to the second side of the aerodynamic device, and a second end opposite of the first end portion at which the first side and the second side converge. The aerodynamic device changes the size and contour of airflow channels between the vanes, increase the efficiency of the thrust reverser.

4 Claims, 6 Drawing Sheets

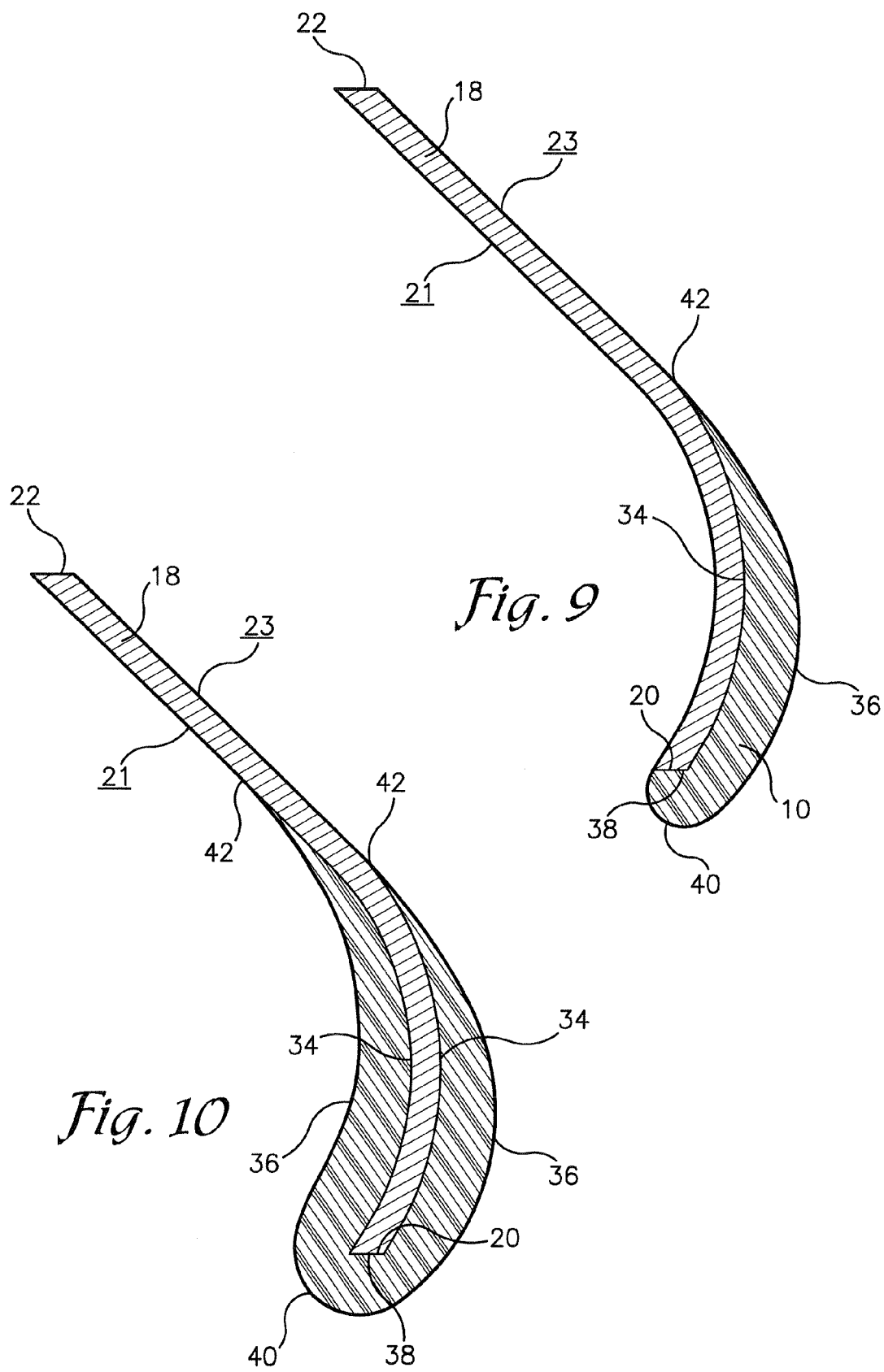

US 8,484,944 B2

AERODYNAMIC DEVICE FOR THRUST REVERSER CASCADES

BACKGROUND

1. Field

Embodiments of the present invention relate to a method and apparatus for modifying cascade thrust reversers.

2. Related Art

Thrust reversers are used in aircraft nacelles to help reverse the flow of air from an aftward direction to a forward and outward direction to slow the aircraft. One type of thrust reverser is a cascade thrust reverser, which features a plurality of cascades of turning vanes arranged in a number of rows and columns and curved in a generally forward direction.

The specific shape of the vanes affects the efficiency of the cascade thrust reverser. When molding a cascade of vanes as a single piece, complex vane geometries can trap portions of the mold within the part after hardening of the cascade. Thus, cascades having complex vane geometry may be expensive, labor-intensive, and time-consuming to produce. Basic geometric vanes of uniform thickness curved to open in a forward direction are simpler to produce. However, in use within the thrust reverser, this simple vane configuration can be subject to the formation of blockage and/or a reduced area for air to flow through.

Accordingly, there is a need for a method and apparatus that increases the efficiency of airflow through cascade thrust reversers and overcomes the limitations of the prior art.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

Embodiments of the present invention solve the above-mentioned problems and provide a distinct advance in the art of cascade thrust reversers. Specifically, the present invention includes an aerodynamic device and method for modifying at least one vane of a cascade thrust reverser. The aerodynamic device may be constructed of low modulus plastic, metal, or composite material. The aerodynamic device may include a first side, a second side opposite of the first side, a ledge portion protruding from the first side, a rounded first end portion extending from the ledge portion to the second side, and a second end (opposite of the first end portion) at which the first and second sides converge.

The aerodynamic device may be configured to be bonded to a vane of the cascade thrust reverser. The first side of the aerodynamic device may be shaped to rest flush against and be bonded to a portion of a forward-facing surface of the vane, while the ledge portion may be configured to rest flush against and be bonded to a blunt leading edge of the vane. A thickness between the first side and the second side of the aerodynamic device may generally taper from a first thickness to a second thickness that is smaller than the first thickness in a direction toward the second end.

A method for modifying a cascade thrust reverser may comprise forming an aerodynamic device, such as the aerodynamic device described above. The method may also include bonding the aerodynamic device to a vane of the cascade thrust reverser. Specifically, a second side of the aerodynamic device may be bonded to a forward-facing surface of the vane, and a ledge portion of the aerodynamic device may be bonded to a blunt leading edge of the vane.

BRIEF DESCRIPTION OF THE DRAWING FIGURES

Embodiments of the present invention are described in detail below with reference to the attached drawing figures, wherein:

FIG. 9 is a cross-sectional view of an alternative embodiment of the aerodynamic device; and FIG. 10 is a cross-sectional view of another alternative embodiment of the aerodynamic device.

Figure 1:
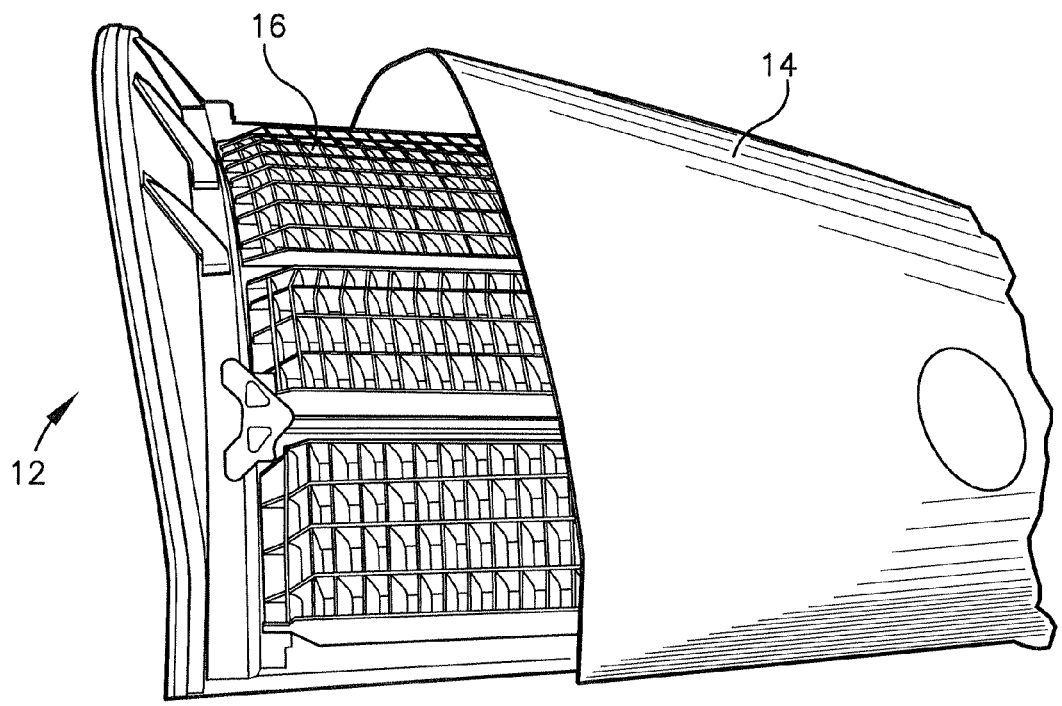
FIG. 1 is a perspective view of one half of a cascade thrust reverser constructed in accordance with an embodiment of the invention.
Figure 2:
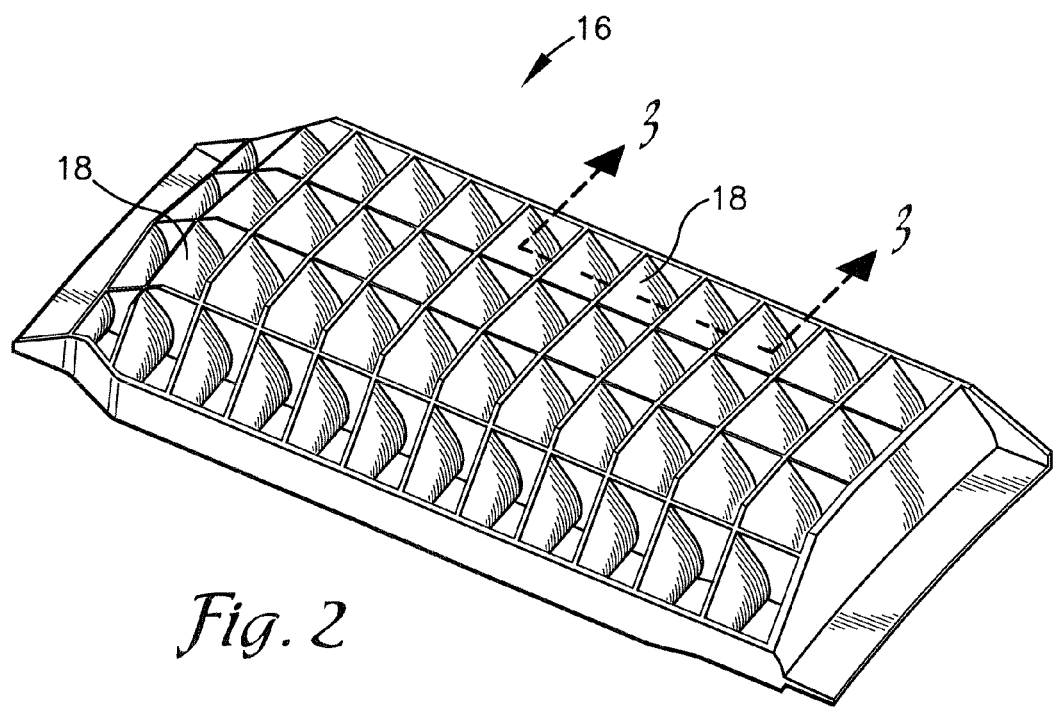
FIG. 2 is a perspective view of a cascade of the thrust reverser of FIG. 1.

The drawing figures do not limit the present invention to the specific embodiment disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 4:
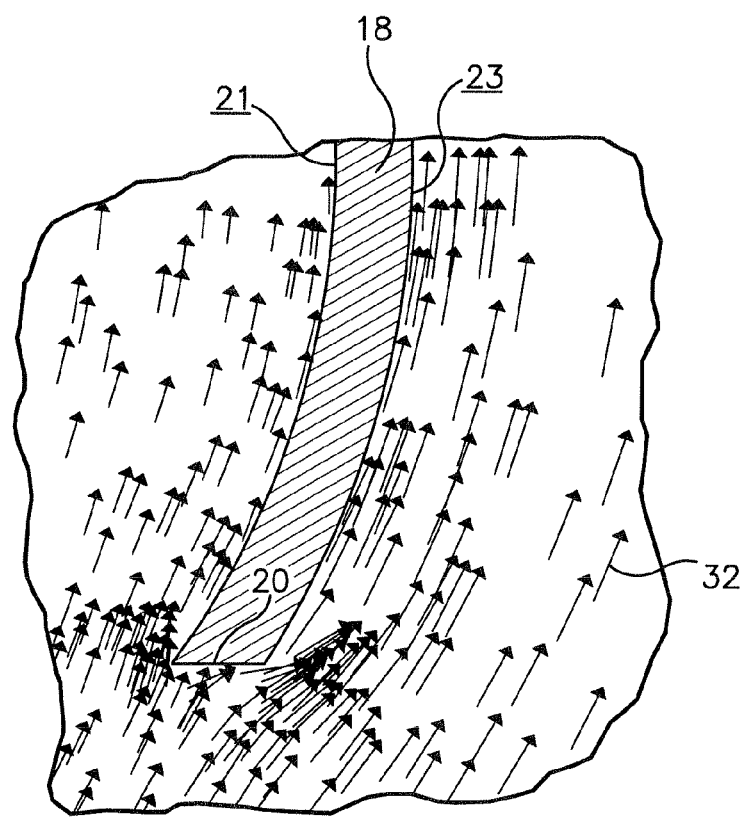
FIG. 4 is a fragmentary cross-sectional view of one of the vanes of FIG. 3 and illustrates airflow contacting an inward-facing blunt leading edge of the vain.
Figure 5:
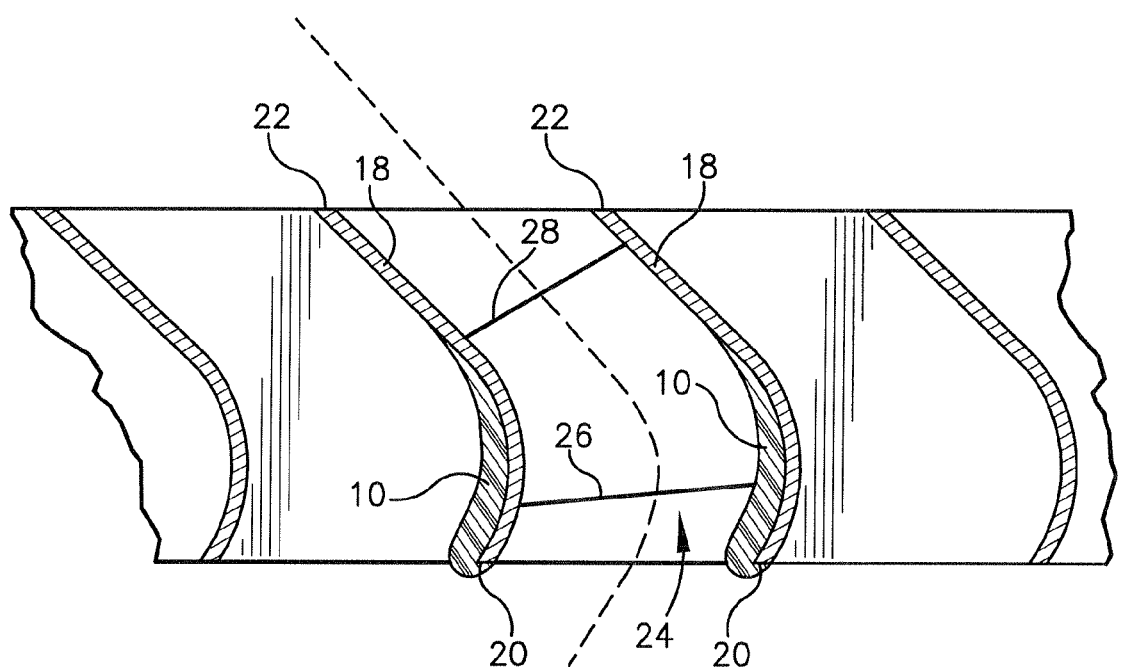
FIG. 5 is a fragmentary cross-sectional view of the plurality of vanes of FIG. 3 having aerodynamic devices constructed in accordance with an embodiment of the invention attached thereto.
Figure 6:
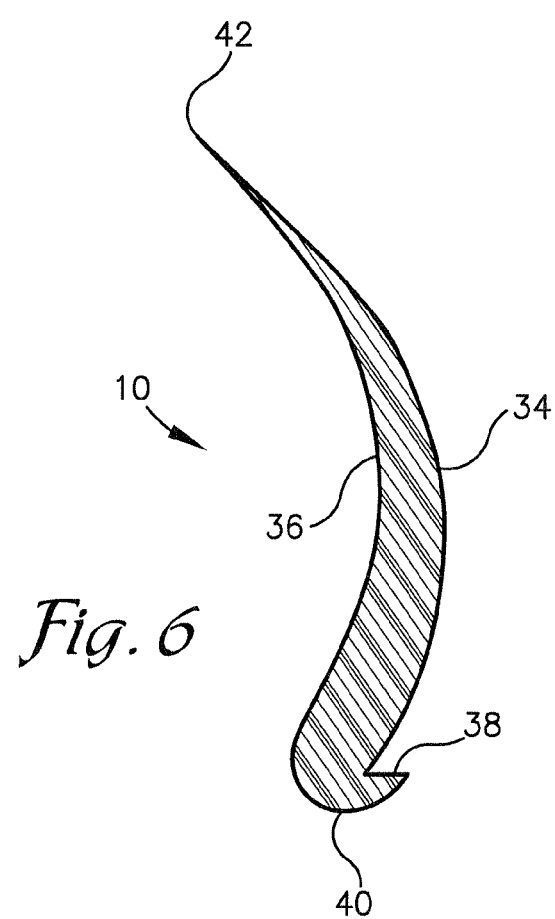
FIG. 6 is a cross-sectional view of one of the aerodynamic devices of FIG. 5.
Figure 7:
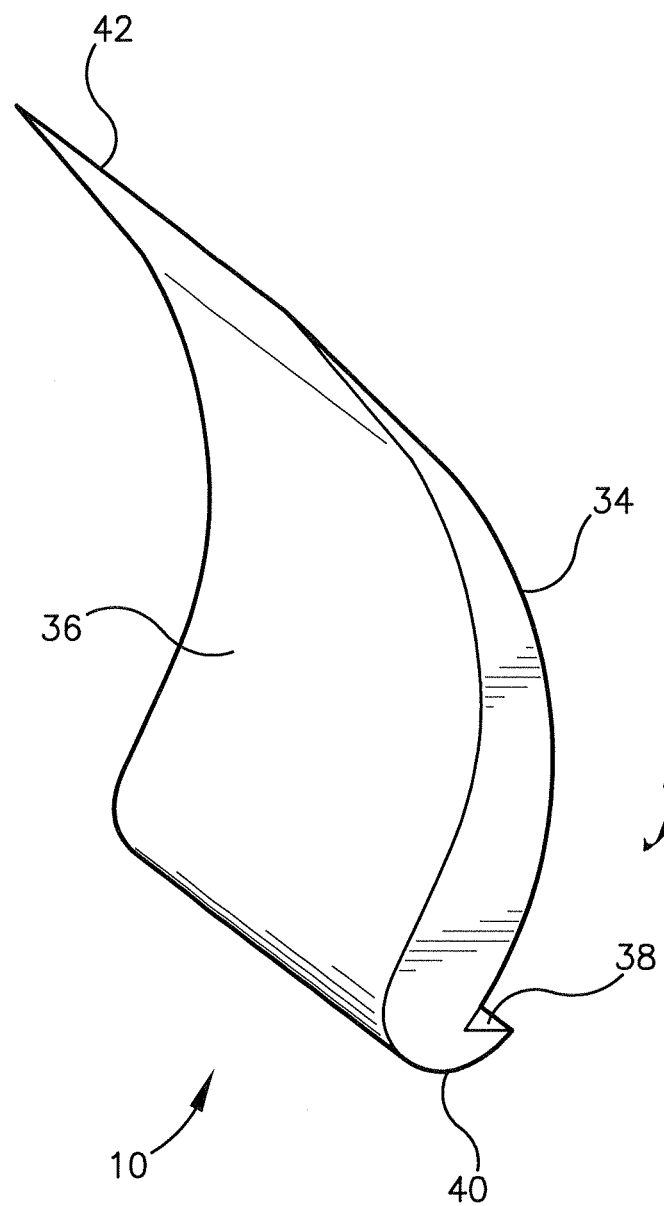
FIG. 7 is a perspective view of one of the aerodynamic devices of FIG. 5.

FIGS. 5-7 illustrate an aerodynamic device 10 constructed in accordance with embodiments of the invention. The aerodynamic device 10 is designed for attachment to an aircraft nacelle's cascade thrust reverser 12, illustrated in FIGS. 1-5. The thrust reverser 12 may comprise a translating sleeve 14 (as illustrated in FIG. 1) operable, in a closed position, to cover one or more cascades 16 of thrust reverser vanes 18. The translating sleeve 14 may also be operable to translate aftward to an open position, as illustrated in FIG. 1, allowing air to flow outward through openings in the cascades 16.

Each of the vanes 18 may have an inward-facing blunt leading edge 20 and an outward-facing trailing edge 22 opposite of the leading edge 20. The vanes 18 may also comprise a forward-facing surface 21 and an aft-facing surface 23. The vanes 18 are each curved in a forward direction relative to the thrust reverser 12, such that air flowing in a forward-to-aft direction in the nacelle may contact the vanes 18 and direct the air flow in a generally forward and outward direction relative to the aircraft nacelle.

Figure 3:
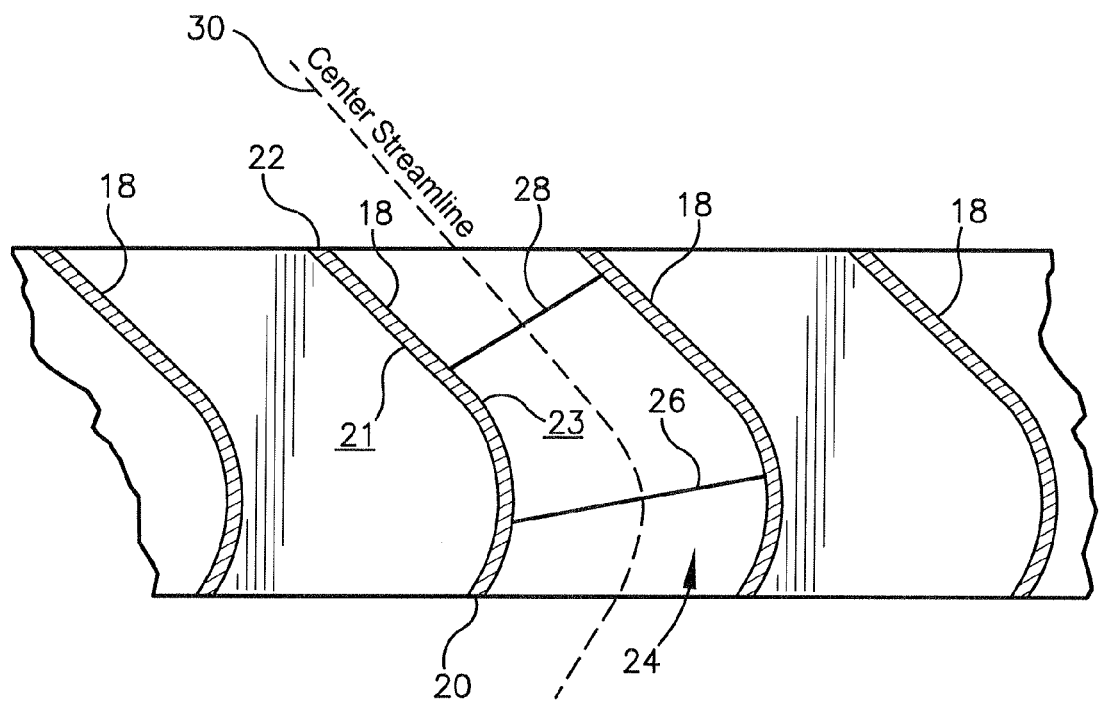
FIG. 3 is a fragmentary cross-sectional view of a plurality of vanes of the cascade of FIG. 2.

The vanes 18 may be equally spaced along a length of the cascades 16. However, a width of an airflow path or channel 24 between two of the vanes 18 is determined relative to the direction of the airflow at any given point therein. For example, as illustrated in FIG. 3, the widths of the channel 24, as illustrated by lines 26 and 28, are measured perpendicular to a direction of the airflow or the center streamline 30 of the airflow. Note that line 26, located at a more curved location within the channel 24, is wider than line 28, which is located further outward relative to a center of the thrust reverser 12. This narrowing of the channel 24 relative to the airflow path can cause the formation of blockage and/or a reduced area for air to flow through.

Furthermore, as illustrated in FIG. 4, when air from within the nacelle impacts the blunt leading edge 20 of the vane 18, the airflow, generally represented by arrows 32, has to make sudden changes in direction to continue downstream. Specifically, the plurality of arrows illustrated in FIG. 4 depicted the direction of airflow at that point. This can also cause the formation of blockage, which may act like a bubble built up on the leading edge 20 that blocks airflow therethrough.

The aerodynamic device 10, or a plurality of aerodynamic devices, are configured to attach to the vanes 18 of the thrust reverser 12 and to solve some of the problems described above by rounding out the blunt leading edge 20 and modifying the width of the channel 24 to lessen the width difference between lines 26 and 28, as shown in FIGS. 3 and 5. The forward-facing surface 21 of each of the vanes of the cascade thrust reverser 12 may have an aerodynamic device, such as the aerodynamic device 10 illustrated in FIGS. 6-7, attached thereto. However, some alternative embodiments of the invention, only a portion of the vanes 18 may have aerodynamic devices attached thereto.

The aerodynamic device 10 may be made of low modulus plastic, metal, composites, or any material suitable for use in an aircraft nacelle. As illustrated in FIGS. 6-7, the aerodynamic device 10 may comprise a first side 34 substantially matching the forward-facing surface 21 of one of the cascade thrust reverser vanes 18, a second side 36 opposite of the first side 34, a ledge portion 38 protruding from the first side 34 and substantially matching the size and shape of the blunt leading edge 20 of one of the thrust reverser vanes 18, and a rounded or curved first end portion 40 extending from the ledge portion 38 to the second side 36 of the aerodynamic device 10. The aerodynamic device 10 may further comprise a second end 42 opposite of the first end portion 40 at which the first side 34 and the second side 36 converge.

In some embodiments of the invention, a thickness of the aerodynamic device 10 between the first and second sides 34,36 may generally taper toward the second end 42. For example, the thickness of the aerodynamic device 10 may taper from a first thickness at a point proximate the ledge portion 38 and the first end portion 40 to a second thickness at the second end 42 which is smaller than the first thickness. The thickness and a length of the aerodynamic device 10 from the first end to the second end may depend on the shape and configuration of the corresponding thrust reverser vane 18 and desired air flow path characteristics within the cascade thrust reverser 12. A width of the aerodynamic device 10 may be approximately equal to a width of the corresponding thrust reverser vane 18.

The aerodynamic device 10 may be positioned onto and bonded to the forward-facing surface 21 of one of the cascade thrust reverser vanes 18. Specifically, the first side 34 of the aerodynamic device 10 may be bonded to the forward-facing surface 21 of one of the thrust reverser vanes 18, and the ledge portion 38 may be bonded to the blunt leading edge 20 of one of the thrust reverser vanes 18. Any bonding method may be used, such as chemical or mechanical bonding methods. For example, the aerodynamic device may be bonded or glued with adhesive to the thrust reverser vane 18 and/or mechanically attached, such as via a tongue and groove joint or other mechanical fasteners.

In an alternative embodiment of the invention, as illustrated in FIG. 9, the aerodynamic device 10 may be shaped and configured to be bonded to the aft-facing surface 23 of the cascade thrust reverser vanes 18. Specifically, the first side 34 of the aerodynamic device 10 may be bonded to the aft-facing surface 23 of one of the thrust reverser vanes 18, and the ledge portion 38 may be bonded to the blunt leading edge 20 of one of the thrust reverser vanes 18. In this configuration, the second side 36 of the aerodynamic device 10 may face in an aftward direction relative to the cascade thrust reverser 12.

In another alternative embodiment of the invention, illustrated in FIG. 10, the aerodynamic device 10 may substantially wrap around the blunt leading edge 20 and may be attached to both the forward-facing surface 21 and the aft-facing surface 23. Specifically, the aerodynamic device 10 may be a hybrid of the embodiment of FIGS. 5-7 and the embodiment of FIG. 9, with two first sides 34 (one positioned flush with each of the vane's surfaces 21,23) and one ledge portion 38 extending between the two first sides 34 and mating flush with the vane's blunt leading edge 20. Furthermore, the aerodynamic device may have two second sides 36, with the rounded first end portion 40 extending between the two second sides 36.

A method of modifying a cascade thrust reverser according to an embodiment of the present invention broadly comprises forming the aerodynamic device 10, as described above, and then attaching the aerodynamic device 10 to one of the vanes 18.

Figure 8:
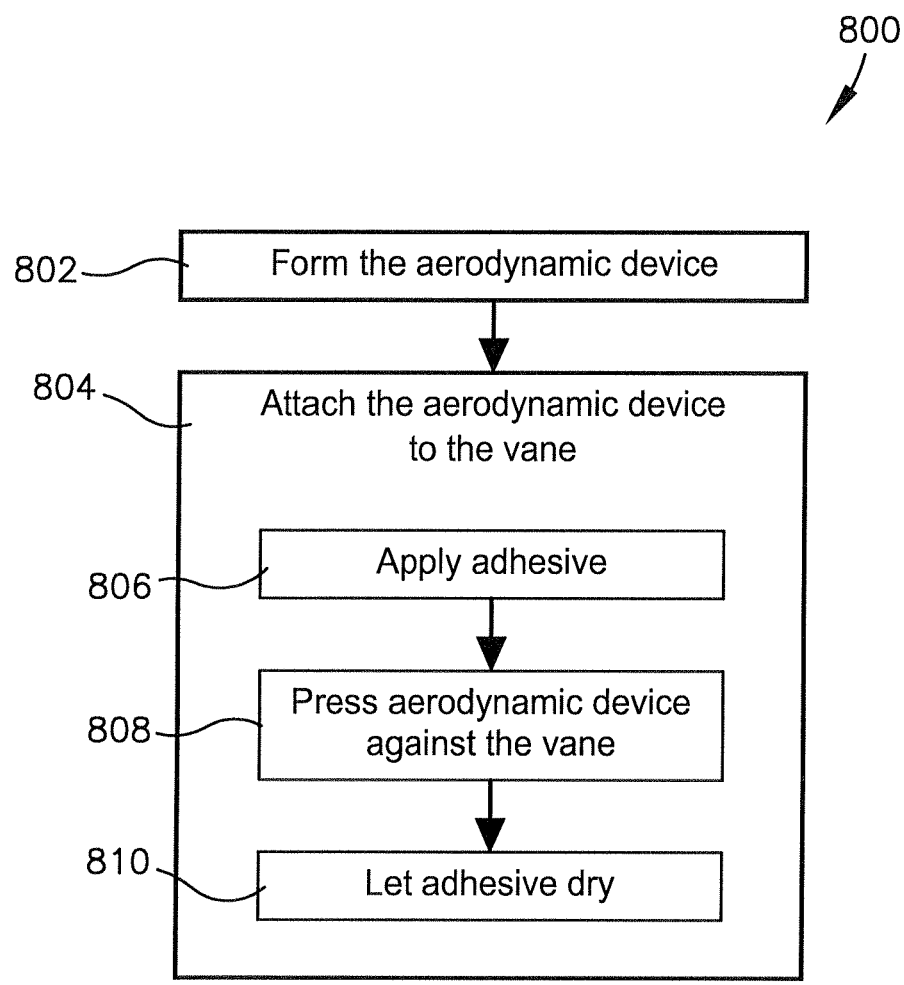
FIG. 8 is a flow chart of a method for increasing the efficiency of a cascade thrust reverser according to an embodiment of the invention.

The flow chart of FIG. 8 depicts the steps of an exemplary method 800 of the invention in more detail. In some alternative implementations, the functions noted in the various blocks may occur out of the order depicted in FIG. 800. For example, two blocks shown in succession in FIG. 800 may in fact be executed substantially concurrently, or the blocks may sometimes be executed in the reverse order depending upon the functionality involved.

The method 800, illustrated in FIG. 8, may comprise forming the aerodynamic device 10 into the configuration described above, as depicted in step 802. Forming the aerodynamic device 10 may be accomplished by molding a material into the desired shape, cutting the material into the desired shape, or any other method for shaping a material suitable for use in an aircraft thrust reverser.

Next, the method may comprise attaching the aerodynamic device 10 to one of the vanes 18, as depicted in step 804. Specifically, the first side 34 of the aerodynamic device 10 may be bonded against the forward-facing surface 21 of the vane 18, and the ledge portion 38 may be bonded against the blunt leading edge 20.

Attaching the aerodynamic device 10 to one of the vanes 18 may comprise any method of bonding. For example, step 804 may comprise applying adhesive to the vane 18 and/or the aerodynamic device 10, as depicted in step 806, pressing the aerodynamic device 10 against the vain 18, as depicted in step 808, and allowing the adhesive to dry, as in step 810. Specifically, the adhesive may be applied to at least one of the forward-facing surface 21 of the vane 18 and the first side 34 of the aerodynamic device 10. Then aerodynamic device 10 may be pressed into the forward-facing surface 21 of the vane 18.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A cascade thrust reverser comprising:
  a cascade having a plurality of vanes arranged in a plurality of rows and columns, wherein each vane has:
    an outward-facing trailing edge,
    an inward-facing blunt leading edge opposite of the trailing edge,
    an aftward-facing surface, and
    a forward-facing surface opposite of the aftward-facing surface; and
  at least one aerodynamic device attached to at least one of the vanes, the aerodynamic device comprising:
    a first side shaped to rest flush against at least a portion of the forward-facing surface of the vane,
    a second side opposite of the first side,
    a ledge portion protruding from the first side and configured to rest flush against the blunt leading edge of the vane,
    a rounded first end portion extending from the ledge portion to the second side of the aerodynamic device, and
    a second end opposite of the first end portion at which the first side and the second side converge.

2. The cascade thrust reverser of claim 1, wherein the aerodynamic device is constructed of low modulus plastic, metal, or composite material.

3. The cascade thrust reverser of claim 1, wherein a thickness between the first side and the second side of the aerodynamic device generally tapers from a first thickness to a second thickness that is smaller than the first thickness in a direction toward the second end.

4. The cascade thrust reverser of claim 1, wherein the aerodynamic device is bonded to the vane mechanically, chemically, or with adhesive.

* * * * *